United States Patent [19]
Beam, III

[11] Patent Number: 5,893,390
[45] Date of Patent: Apr. 13, 1999

[54] FLOW CONTROLLER

[75] Inventor: Edward A. Beam, III, Dallas, Tex.

[73] Assignee: Texas Instruments Incorporated, Dallas, Tex.

[21] Appl. No.: 08/944,205

[22] Filed: Oct. 3, 1997

Related U.S. Application Data

[60] Provisional application No. 60/028,857, Oct. 16, 1996.

[51] Int. Cl.$^6$ .............................. G05D 7/00; F16K 11/16
[52] U.S. Cl. ................ 137/599; 137/862; 137/870; 137/872; 251/65
[58] Field of Search ........................... 137/599, 601, 137/862, 870, 872; 251/65

[56] References Cited

U.S. PATENT DOCUMENTS

| | | | |
|---|---|---|---|
| 3,792,719 | 2/1974 | Dickinson | 137/599 X |
| 3,827,457 | 8/1974 | Vutz et al. | 137/599 |
| 4,518,011 | 5/1985 | Stoll | 137/599 X |
| 4,561,471 | 12/1985 | Diaz | 137/870 |
| 5,313,871 | 5/1994 | Kaneko et al. | 137/599 X |

*Primary Examiner*—Stephen M. Hepperle
*Attorney, Agent, or Firm*—Mark A. Valetti; Carlton H. Hoel; Richard L. Donaldson

[57] ABSTRACT

An apparatus (10) is provided for controlling the flow of a fluid. The apparatus (10) includes a housing (12) having an inlet port (14), an outlet port (16), and a bypass port (18). A throughput block (26) is contained within the housing (12). The throughput block (26) has a number of cylinders (28) formed therein. A number of pistons (34) are received within the cylinders (28). Each piston (34) can move within a corresponding cylinder (28) between a first position and a second position. In the first position, the piston (34) prevents fluid communication between the inlet port (14) and the outlet port (16) and allows fluid communication between the inlet port (14) and the bypass port (18). In the second position, the piston (34) prevents fluid communication between the inlet port (14) and the bypass port (18) and allows fluid communication between the inlet port (14) and the outlet port (16).

20 Claims, 1 Drawing Sheet

FLOW CONTROLLER

This application claims the benefit of provisional application 60/028,857 filed Oct. 16, 1996

BACKGROUND OF THE INVENTION

It is often desirable to control the rate at which a fluid, such as a gas, is delivered to an intended destination. For example, gas precursors can be used as doping sources in an ultra-high vacuum molecular beamepitaxy technique for producing semiconductor device structures. Because dopant concentrations are directly related to the flow rate of the gas precursors, control of such flow rate is necessary. Furthermore, in some applications, the flow rate of a fluid may need to be varied over a broad dynamic range of several orders of magnitude. Referring again to the example of an ultra-high vacuum molecular beamepitaxy process, the flow of gas precursors may be varied over three orders of magnitude during processing in order to produce dopant concentrations ranging from $10^{16}$ to $10^{19}$ cm$^{-3}$.

According to one prior technique, control of gas flow was achieved by diluting a precursor gas with an inert gas. Such technique, however, is not desirable with an ultra-high vacuum molecular beamepitaxy system because the addition of an inert gas increases the gas load on the vacuum pumping system. Consequently, in other prior techniques, temperature-controlled or pressure-controlled mass flow controllers were used to vary the flow rate of a gas. These previously developed mass flow controllers, however, suffered from numerous problems. For example, such flow controllers included complex electronics which needed to be recalibrated often. Also, these flow controllers employed mechanical valves which extended from the outside of the controllers into the interior. Fluid could escape from the controllers at such mechanical valves. Yet another problem was that the previously developed flow controllers operated within a limited dynamic range of flow rates, and thus were incapable of varying gas flow over several orders of magnitude. Furthermore, specific flow rates could not be consistently reproduced using such mass flow controllers.

TECHNICAL FIELD OF THE INVENTION

This invention relates generally to the field of fluid delivery systems, and more particularly, to a flow controller.

SUMMARY OF THE INVENTION

In accordance with the present invention, the disadvantages and problems associated with previous devices for controlling the flow rate of a fluid have been substantially reduced or eliminated.

According to an embodiment of the present invention, an apparatus is provided for controlling the flow of a fluid. The apparatus includes a housing having an inlet port, an outlet port, and a bypass port. A throughput block is contained within the housing. The throughput block has a number of cylinders formed therein. A number of pistons are received within the cylinders. Each piston can move within a corresponding cylinder between a first position and a second position. In the first position, the piston prevents fluid communication between the inlet port and the outlet port and allows fluid communication between the inlet port and the bypass port. In the second position, the piston prevents fluid communication between the inlet port and the bypass port and allows fluid communication between the inlet port and the outlet port.

According to another embodiment of the present invention, an apparatus is provided for controlling the flow of a fluid. The apparatus includes a housing having an inlet port, an outlet port, and a bypass port. A throughput block is contained within the housing and has a number of cylinders formed therein. A number of pistons, formed from a magnetic material, are received within the cylinders. Each piston can move within a corresponding cylinder between a first position and a second position. In the first position, the piston prevents fluid communication between the inlet port and the outlet port and allows fluid communication between the inlet port and the bypass port. In the second position, the piston prevents fluid communication between the inlet port and the bypass port and allows fluid communication between the inlet port and the outlet port. At least one magnet functions to attract at least one piston to either the first position or the second position.

The present invention provides various technical advantages overprior devices for controlling the flow rate of a fluid. One technical advantage includes forming a flow controller having a throughput block and pistons completely sealed within a housing. Although the throughput block and the pistons serve the same function as previously developed mechanical valves, fluid is not able to leak out of the flow controller at the throughput block and pistons. Another technical advantage of the present invention includes providing a flow controller which can be used in cascading arrangement with additional flow controllers to vary the flow rate of a fluid over several orders of magnitude. Yet another technical advantage of the present invention includes providing a flow controller which does not employ complex electronics to adjust flow rate, and consequently, does not require constant recalibration. Another advantage of the present invention includes a flow controller employing a plurality of cylinders and corresponding pistons which provide discrete adjustment of fluid flow, and thus can reproduce specific flow rates. Other technical advantages are readily apparent to one skilled in the art from the following figures, description and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
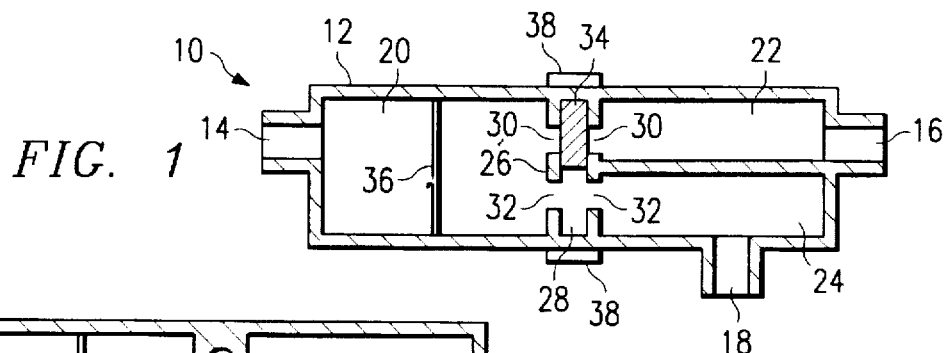
FIG. 1 is a side cross-sectional view of a flow controller constructed in accordance with the teachings of the present invention.

FIG. 1 is a side cross-sectional view of a flow controller 10, constructed in accordance with the teachings of the present invention. Flow controller 10 includes a housing 12 having an inlet port 14, an outlet port 16, and a bypass port 18. Inlet port 14 may be connected to a gas source and functions to receive a gas flowing into flow controller 10. Outlet port 16 functions to direct the flow of gas toward an intended destination, such as the reactor of an ultra-high vacuum molecular beamepitaxy processing machine. Bypass port 18 can direct the flow of gas out of controller 10 toward a bypass route, such as an auxiliary pump line. With the exception of ports 14–18, housing 12 may be completely sealed so that gas is not able to escape at any other point. Accordingly, housing 12 may be formed of any suitable material which can be fluidly sealed, such as a metal, a metallic compound, or a polymer. For example, housing 12 may be formed from stainless steel, aluminum, oreflon.

A plurality of chambers may be defined within housing 12. The chambers include an input chamber 20, an output chamber 22, and a bypass chamber 24. Input chamber 20 is in communication with inlet port 14. Output chamber 22 is in communication with outlet port 16. Bypass chamber 24 is in communication with bypass port 18.

A throughput block 26 is contained within housing 12. Preferably, throughput block 26 is hermetically sealed within housing 12. Throughput block 26 may be formed integral with housing 12, or alternatively, as a separate unit which is incorporated into housing 12. Preferably, throughput block 26 is formed of a material, such as teflon, which is relatively chemically inert and has a low coefficient of friction. Throughput block 26 comprises a plurality of cylinders 28 having at least one set of opposing apertures, including output apertures 30 and bypass apertures 32. Each set of opposing output apertures 30 provides communication between input chamber 20 and output chamber 22 through a corresponding cylinder 28. Each set of opposing bypass apertures 32 provides communication between input chamber 20 and bypass chamber 24 through one of cylinders 28.

A separate piston 34 may be disposed within each cylinder 28. Preferably, pistons 34 are formed from a material which is magnetic and chemically inert, such as stainless steel or nickel. Each piston 34 is operable to move between a first position and a second position within its corresponding cylinder 28. In the first position, a piston 34 may block communication between input chamber 20 and output chamber 22 via the corresponding set of output apertures 30. The exemplary piston 34 of FIG. 1 is illustrated in the first position. In the second position, a piston 34 may block communication between input chamber 20 and bypass chamber 24 via the corresponding bypass apertures 32. Pistons 34 can move independently of each other. The surfaces of pistons 34 can be highly polished in order to create the least amount of friction with cylinders 28.

A diffuser plate 36 may be contained within input chamber 20 of housing 12. Diffuser plate 36 functions to evenly distribute the flow of a gas as it enters from inlet port 14. Diffuser plate 36 may be formed as a solid sheet containing a plurality of apertures for permitting the flow of gas therethrough. Alternatively, diffuser plate 36 may be formed as a mesh screen within a frame, as illustrated below in FIG. 3.

A set of opposing magnets 38 may be located on the external surfaces of housing 12 at opposite ends of a cylinder 28. Generally, opposing magnets 38 function to move pistons 34 between the first and second positions. In one embodiment, opposing magnets 38 may comprise electromagnets 38a, which are turned on by the application of electricity. A separate set of electromagnets 38a may be provided for each cylinder 28, as shown and described below with reference to FIG. 4. In another embodiment, opposing magnets 38 may comprise a pair of bar magnets 38b which are connected in moveable relation to housing 12. Bar magnets 38b are illustrated and described below in more detail with reference to FIG. 5.

Figure 2:
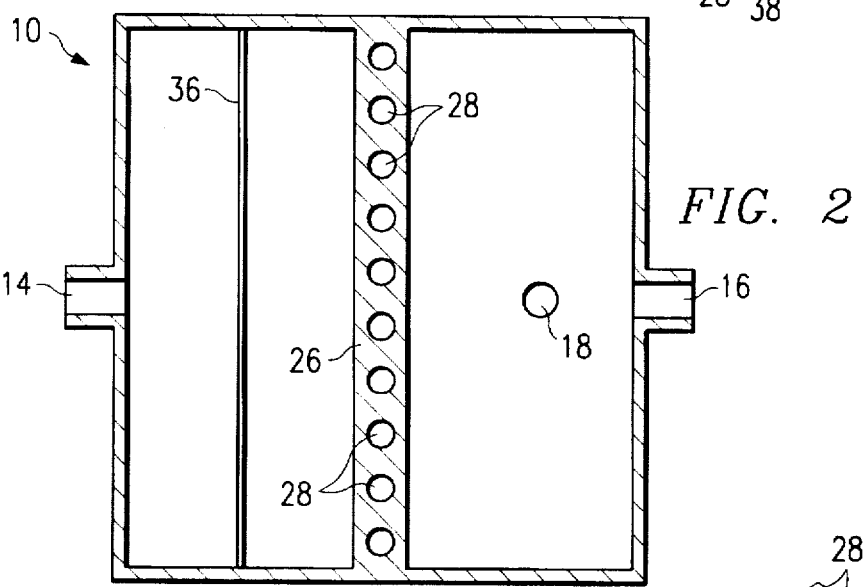
FIG. 2 is an overhead cross-sectional view of the flow controller illustrated in FIG. 1.

FIG. 2 is an overhead cross-sectional view of flow controller 10. In this embodiment of the present invention, throughput block 26 includes ten cylinders 28. It should be understood, however, that in other embodiments throughput block 26 may include fewer or greater number of cylinders 28. Although not explicitly shown, ten corresponding pistons 34 can be disposed in slidable relation within the ten cylinders 28. As shown, flow controller 10 comprises a single inlet port 14, a single outlet port 16, and a single bypass port 18. In other embodiments, however, flow controller 10 may include multiple inlet, outlet, and/or bypass ports.

Figure 3:
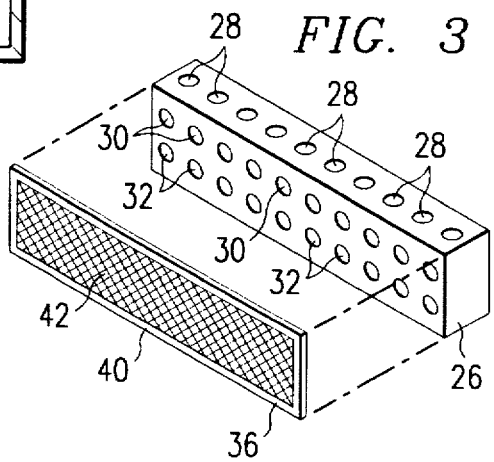
FIG. 3 is a perspective view of the diffuser plate and the throughput block illustrated in cross-section in FIGS. 1 and 2.

FIG. 3 is a perspective view of throughput block 26 and diffuser plate 36. As shown, throughput block 26 comprises ten cylinders 28. A corresponding set of output apertures 30 and a corresponding set of bypass apertures 32 are provided for each cylinder 28. Although each of cylinders 28, output apertures 30, and bypass apertures 32 are illustrated as having a circular shape, it should be understood that any or all of these openings in throughput block 26 may be formed in any suitable shape, such as rectangular, trapezoidal, or triangular. Pistons 34 are shaped according to the shape of corresponding cylinders 28. As shown in FIG. 3, diffuser plate 36 may comprise a frame 40 and a mesh screen 42.

Figure 4:
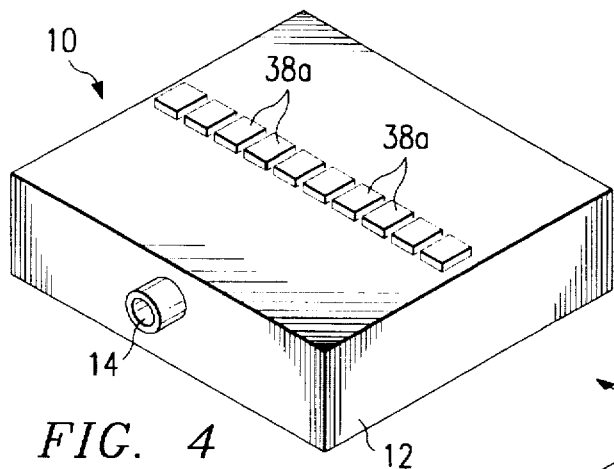
FIG. 4 is a perspective view of a flow controller according to one embodiment of the present invention.

FIG. 4 is a perspective view of a flow controller 10, according to one embodiment of the present invention. In this embodiment, a separate electromagnet 38a may be disposed on an upper surface of housing 12 over each cylinder 28 within throughput block 26 contained in the housing. Although not visible, a plurality of corresponding electromagnets 38a may be disposed on a bottom surface of housing 12 in opposition to the electromagnets 38a disposed on the upper surface. Electromagnets 38a on the upper surface function to attract pistons 34 into the first positions within cylinders 28. Electromagnets 38a on the bottom surface of housing 12 function to attract pistons 34 into the second positions within cylinders 28.

Figure 5:
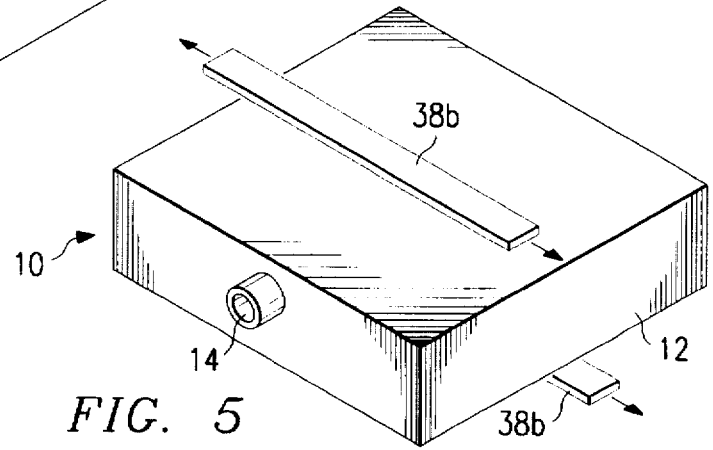
FIG. 5 is a perspective view of a flow controller according to another embodiment of the present invention.

FIG. 5 is a perspective view of a flow controller 10 according to another embodiment of the present invention. In this embodiment, magnets 38 may comprise opposing bar magnets 38b which can be moved inslidable relation over or under cylinders 28 of throughput block 26 within housing 12. More specifically, the first opposing bar magnet 38b may beslidably attached to the upper surface of housing 12. This bar magnet 38b functions to attract pistons 34 into first positions within cylinders 28. The second bar magnet 38b may be slidably attached to the bottom surface of housing 12, and functions to attract pistons 34 into second positions.

In operation, flow controller 10 is coupled to a gas source, an intended destination for a gas flow (e.g., an ultra-high vacuum molecular beamepitaxy system), and a bypass route (e.g., an auxiliary pump). More specifically, inlet port 14 is connected to the gas source, outlet port 16 is connected to the intended destination, and bypass port 18 is connected to the bypass route. Gas from the gas source is received into input chamber 20 of housing 12 via inlet port 14. Diffuser plate 36 disperses the gas within input chamber 20 so that the gas uniformly reaches output apertures 30 and bypass apertures 32 of throughput block 26. Depending upon the desired flow rate of gas to the intended destination, a specific number of pistons 34 may be moved into the first positions within-corresponding cylinders 28, while the remaining pistons 34 may be moved into the second positions. In one embodiment, such as that shown in FIG. 4, electromagnets 32a may be turned on and turned off to move pistons 34 between the first position and the second position. Alternatively, in the embodiment shown in FIG. 5, bar magnets 32b may be slid across the external surface of housing 12 to attract pistons 34 into either the first or the second position. Each piston 34 in a first position blocks the flow of gas between input chamber 20 and output chamber 22, but allows the flow of gas from input chamber 20 into bypass chamber 24 via bypass apertures 32. Each piston 34 in a second position blocks gas flow between input chamber 20 and bypass chamber 24, but allows gas flow between input chamber 20 and output chamber 22 via output apertures 30. Gas which moves into output chamber 22 is routed to the intended destination via outlet port 16; gas which moves into bypass chamber 24 is routed to a bypass via bypass port 18.

Flow controller 10 is able to provide discrete adjustment of the flow rate of gas. Because diffuser plate 36 evenly disperses the gas, approximately the same amount of gas flows through each cylinder 28, either to output chamber 22 or bypass chamber 24. Thus, the flow of gas to either the intended destination or the bypass route is directly proportionate to the number pistons in the first or second positions. For example, if flow controller 10 has ten pistons and all of these pistons are in the first position, then 100% of the gas flow is directed to the bypass route. If nine pistons are in the first position and one piston is in the second position, 90% of the gas flow is directed to the bypass route and 10% of the gas flow is directed to the intended destination. In this manner, flow controller 10 is able to adjust the flow rate of gas therethrough, with reproducible results. In addition, two or more flow controllers 10 may be coupled together in cascading arrangement so that flow rates can be varied over several orders of magnitude if desired.

Throughput block 26 and the pistons 34 serve the same function as the mechanical valves employed in previously developed mass flow controllers. Unlike the mechanical valves, however, throughput block 26 and pistons 34 are completely sealed within housing 12. Accordingly, flow controller 10 does not have the leakage problems associated with previously developed mass flow controllers.

As described above, the adjustment of flow rates in flow controller 10 is accomplished without complex electronics. Consequently, unlike prior mass flow controllers, flow controller 10 does not require constant recalibration.

Although the present invention and its advantages have been described in detail, it should be understood that various changes, substitutions, and alterations can be made herein without departing from the spirit and scope of the invention as defined by the appended claims.

What is claimed is:

1. An apparatus for controlling the flow of a fluid, comprising:
a housing having an inlet port, an outlet port, and a bypass port;
a throughput block contained within the housing and having a plurality of cylinders formed therein; and
a plurality of pistons received within the cylinders, each piston operable to move within a corresponding cylinder between a first position and a second position, wherein in the first position the piston prevents fluid communication between the inlet port and the outlet port and allow fluid communication between the inlet port and the bypass port, and wherein in the second position the piston prevents fluid communication between the inlet port and the bypass port and allows fluid communication between the inlet port and the outlet port.

2. The apparatus of claim 1, wherein each piston is formed from a magnetic material, and further comprising at least one magnet operable to attract at least one piston to either the first position or the second position.

3. The apparatus of claim 1, wherein each piston is formed from a magnetic material, and further comprising a plurality of magnetic elements disposed on a surface of the housing proximate the pistons, each magnetic element operable to attract a corresponding piston to either the first position or the second position.

4. The apparatus of claim 3, wherein each magnetic element comprises an electrically activated magnet.

5. The apparatus of claim 1, wherein each piston is formed from a magnetic material, and further comprising at least one bar magnet slidably disposed on a surface of the housing proximate the pistons, the bar magnet operable to attract each piston to either the first position or the second position.

6. The apparatus of claim 1, further comprising a diffuser plate disposed within the housing proximate the inlet port, the diffuser plate operable to distribute the flow of a gas within the housing.

7. The apparatus of claim 1, wherein each cylinder comprises a set of output apertures providing fluid communication between the inlet port and the outlet port, each cylinder further comprising a set of bypass apertures providing fluid communication between the inlet port and the bypass port.

8. The apparatus of claim 1, wherein the housing is formed from a material selected from the group of material comprising metal and polymer.

9. The apparatus of claim 1, wherein the throughput block is hermetically sealed within the housing.

10. The apparatus of claim 1, wherein an input chamber, an output chamber, and a bypass chamber are defined within the housing.

11. An apparatus for controlling the flow of a fluid, comprising:
a housing having an inlet port, an outlet port, and a bypass port;
a throughput block contained within the housing and having a plurality of cylinders formed therein, each cylinder having a set of output apertures providing fluid communication between the inlet port and the outlet port, each cylinder further having a set of bypass apertures providing fluid communication between the inlet port and the bypass port; and
a plurality of pistons received within the cylinders, each piston operable to move within a corresponding cylinder between a first position and a second position, wherein in the first position the piston prevents fluid communication through a corresponding set of output apertures and allows fluid communication through a corresponding set of bypass apertures, and wherein in the second position the piston prevents fluid communication through the corresponding set of bypass apertures and allows fluid communication through the corresponding set of output apertures.

12. The apparatus of claim 11, wherein each piston is formed from a magnetic material, and further comprising a plurality of magnetic elements disposed on a surface of the housing proximate the pistons, each magnetic element operable to attract a corresponding piston to either the first position or the second position.

13. The apparatus of claim 12, wherein each magnetic element comprises an electrically activated magnet.

14. The apparatus of claim 11, wherein each piston is formed from a magnetic material, and further comprising at least one bar magnet slidably disposed on a surface of the housing proximate the pistons, the bar magnet operable to attract each piston to either the first position or the second position.

15. The apparatus of claim 11, wherein the housing is formed from a material selected from the group of material comprising metal and polymer.

16. The apparatus of claim 11, wherein the throughput block is hermetically sealed within the housing.

17. An apparatus for controlling the flow of a fluid, comprising:

a housing having an inlet port, an outlet port, and a bypass port;

a throughput block contained within the housing and having a plurality of cylinders formed therein;

a plurality of pistons formed from a magnetic material and received within the cylinders, each piston operable to move within a corresponding cylinder between a first position and a second position, wherein in the first position the piston prevents fluid communication between the inlet port and the outlet port and allows fluid communication between the inlet port and the bypass port, and wherein in the second position the piston prevents fluid communication between the inlet port and the bypass port and allows fluid communication between the inlet port and the outlet port; and at least one magnet operable to attract at least one piston to either the first position or the second position.

18. The apparatus of claim 17, wherein the magnet further comprises a plurality of magnetic elements disposed on a surface of the housing proximate the pistons, each magnetic element operable to attract a corresponding piston to either the first position or the second position.

19. The apparatus of claim 18, wherein each magnetic element comprises an electrically activated magnet.

20. The apparatus of claim 17, wherein the magnet further comprises at least one bar magnet slidably disposed on a surface of the housing proximate the pistons, the bar magnet operable to attract each piston to either the first position or the second position.

\* \* \* \* \*